United States Patent Office 2,803,652
Patented Aug. 20, 1957

2,803,652
INTERMEDIATE PRODUCT AND PROCESS FOR MAKING IT

Henri Riat, Arlesheim, Switzerland, assignor to Ciba Limited, Basel, Switzerland No Drawing. Application January 3, 1955, Serial No. 479,643

Claims priority, application Switzerland January 7, 1954

3 Claims. (Cl. 260—509)

In the experimental reports in Publication Board 73,754, pages 2493 to 2502 (indexed by the Office of Technical Services, U. S. Department of Commerce, under the title "Various Investigations on Dyes, 1936–1938," and available in microfilm or in photocopy from the Library of Congress, Washington, D. C.), are described experiments on the reaction of 2:8-dihydroxynaphthalene-6-sulfonic acid and 2:5-dihydroxynaphthalene-7-sulfonic acid with various aromatic amines containing groups imparting solubility in water, including aminonaphthalene mono- and di-sulfonic acids, in the presence of sodium bisulfite (the so-called Bucherer reaction). As these reports themselves indicate, the experiments did not lead to the desired result. Final products were obtained which, on analysis, did not correspond with the expected 2-arylamino-8-hydroxynaphthalene-6-sulfonic acids and 2-arylamino-5-hydroxynaphthalene-7-sulfonic acids, respectively. Further work in this field has also shown that in reactions of this kind, especially in the reaction of the aforesaid dihydroxynaphthalene sulfonic acids with various aminonaphthalene sulfonic acids such, for example, as 1-aminonaphthalene-4- or -7-sulfonic acid or 2-aminonaphthalene-6-sulfonic acid, useful products are not formed or at least cannot be isolated from the reaction mixture. The reaction of 2:5-dihydroxynaphthalene-7-sulfonic acid with 1-aminonaphthalene-6-sulfonic acid also fails in this respect.

It could, therefore, not be expected that the reaction of 2:8-dihydroxynaphthalene-6-sulfonic acid or 2-amino-8-hydroxynaphthalene-6-sulfonic acid with 1-aminonaphthalene-6-sulfonic acid would take place entirely in the manner desired, and that it enables a substantially pure product to be isolated. It is also remarkable that the 1-aminonaphthalene-6-sulfonic acid, which is obtained in the manufacture of 1-aminonaphthalene-7-sulfonic acid as a by-product usually little desired, exhibits this favourable behaviour.

Accordingly, the present invention provides as a new compound 2-[naphthyl-(1')-amino]-8-hydroxynaphthalene-6:6'-disulfonic acid, and also provides a process for making it by reacting 2-amino-8-hydroxynaphthalene-6-sulfonic acid or 2:8-dihydroxynaphthalene-6-sulfonic acid with 1-aminonaphthalene-6-sulfonic acid in an aqueous medium at a raised temperature in the presence of a salt of sulfurous acid.

The reaction of the 2-amino-8-hydroxynaphthalene-6-sulfonic acid or 2:8-dihydroxynaphthalene-6-sulfonic acid with the 1-aminonaphthalene-6-sulfonic acid can be carried out in other respects in a manner in itself known. The sulfonic acids containing hydroxyl groups are advantageously added to the reaction mixture in the form of their alkali metal salts. The reaction of the two starting materials with a salt of sulfurous acid, especially an acid salt such, for example, as sodium bisulfite, is carried out at a raised temperature, for example, in an open vessel at the boiling temperature of the reaction mixture and under reflux.

The new 2-[naphthyl-(1')-amino]-8-hydroxynaphthalene-6:6'-disulfonic acid is a valuable intermediate product for the manufacture of dyestuffs. It is especially valuable when used as a coupling component in the manufacture of azo-dyestuffs by coupling diazo-components with coupling components, it being especially suitable for the manufacture of polyazo-dyestuffs, for example, instead of components of the type of 2-phenylamino-6-hydroxynaphthalene-8-sulfonic acids which may contain as a substituent in the phenyl nucleus, for example, a carboxylic acid or sulfonic acid group.

The following example illustrates the invention, the parts and percentages being by weight.

A mixture of 252 parts of the sodium salt of 2:8-dihydroxynaphthalene-6-sulfonic acid, 240 parts of 1-aminonaphthalene-sulfonic acid, 1000 parts of sodium bisulfite solution of 40 percent strength, 130 parts of sodium hydroxide solution of 30 percent strength and 300 parts of water is maintained at the boil for 30–40 hours under reflux, while stirring. After cooling, the precipitated reaction product is filtered off and washed with sodium chloride solution of 10 percent strength. For the purpose of purification the product is dissolved in hot water, and freed from undissolved impurities by filtration. The filtrate is acidified with hydrochloric acid and heated until the evolution of sulfur dioxide ceases, and then the disodium salt of the 2-[naphthyl-(1')-amino]-8-hydroxynaphthalene-6:6'-disulfonic acid is obtained in the pure state by salting out. When dried it is a pale yellowish grey substance.

A product obtained in this manner and recrystallized from water has the empirical formula $C_{20}H_{13}O_7NS_2Na_2$

|            | N, Percent | S, Percent |
|------------|------------|------------|
| Calculated | 2.86       | 13.09      |
| Found      | 2.86       | 13.13      |

Instead of 2:8-dihydroxynaphthalene-6-sulfonic acid, 2-amino-8-hydroxynaphthalene-6-sulfonic acid can be used with practically the same result.

What is claimed is:

1. 2-[naphthyl-(1')-amino] - 8 - hydroxynaphthalene-6:6'-disulfonic acid, which in its free acid state corresponds to the formula

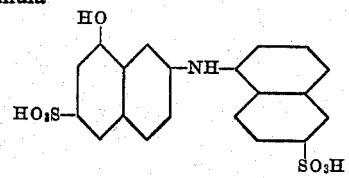

2. Process for the manufacture of 2-[naphthyl-(1')-amino]-8-hydroxynaphthalene-6:6'-disulfonic acid which comprises reacting in an aqueous medium at a raised temperature in the presence of a salt of sulfurous acid a member selected from the group consisting of 2-amino-8-hydroxynaphthalene-6-sulfonic acid and 2:8-dihydroxynaphthalene-6-sulfonic acid with 1-aminonaphthalene-6-sulfonic acid.

3. Process for the manufacture of 2-[naphthyl-(1')-amino]-8-hydroxynaphthylene-6:6'-disulfonic acid which comprises reacting in an aqueous medium at a raised temperature in the presence of a salt of sulfurous acid 2:8-dihydroxynaphthalene-6-sulfonic acid with 1-aminonaphthalene-6-sulfonic acid.

References Cited in the file of this patent

UNITED STATES PATENTS

| 649,714   | Bammann et al.    | May 15, 1900  |
| 2,347,042 | Fleischhauer et al. | Apr. 18, 1944 |

FOREIGN PATENTS

| 22,804 1899 | Great Britain | Sept. 15, 1900 |